Dec. 9, 1924.

G. L. HALL

LAMP

Filed June 24, 1921

1,518,787

Inventor
George L. Hall.

By Frank H. Borden his Attorney

Patented Dec. 9, 1924.

1,518,787

UNITED STATES PATENT OFFICE.

GEORGE L. HALL, OF NEWARK, NEW JERSEY, ASSIGNOR TO CLOX-LITE MFG. COMPANY, INC., OF PERKASIE, PENNSYLVANIA, A CORPORATION OF DELAWARE.

LAMP.

Application filed June 24, 1921. Serial No. 480,229.

*To all whom it may concern:*

Be it known that I, GEORGE L. HALL, a citizen of the United States, residing at Newark, in the county of Essex and State of New Jersey, have invented certain new and useful Improvements in Lamps, of which the following is a specification.

My invention relates to lamps, pertaining particularly to a combined parking lamp and mirror for vehicles.

It has become customary to use parking lamps on vehicles when they are stationary at night on a public highway with the idea in mind of displaying a white light to the front and a red light to the rear and utilizing but a single bulb or illuminating source for both lights. It is also common to use a plane or convex mirror as an aid to driving as it enables the operator to see what is coming behind him.

It is one of the objects of my invention to combine a parking lamp with a mirror on a single standard so that neither of the articles interferes with the free use of the other. It is a further object of my invention to provide a danger signal of colored light which is so arranged that the further the observer is from the source of light, the larger the light appears—and conversely; so that the closer the observer, as for instance, from the driver's or operator's seat, the smaller and less noticeable the signal appears.

A further object of my invention is to provide, in connection with an automobile accessory, an auxiliary driving light, more particularly of use in disclosing ditches, etc., at the side of the vehicle, which might not otherwise be seen under certain driving conditions.

In carrying out my invention I provide a convex or plane mirror having part of the reflecting surface removed at substantially the center, leaving clear glass; and in juxtaposition to, and in rear of, said clear portion I place a colored light filter or transmitter such as a colored lens of a lamp, a center of illumination in the lamp and a clear glass lens on the other side of said illuminating center the whole mounted on a single standard. I may also provide a lateral opening for the illumination of the side of a road.

In the accompanying drawings, forming a part of my specification—

Figure 1:
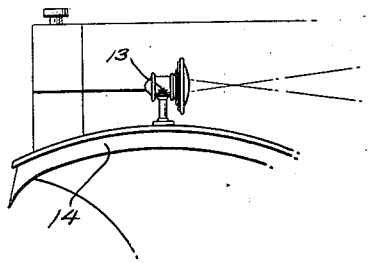
Fig. 1 is a fragmentary view of the fender of a vehicle with my combined parking lamp and mirror in position thereon.
Figure 2:
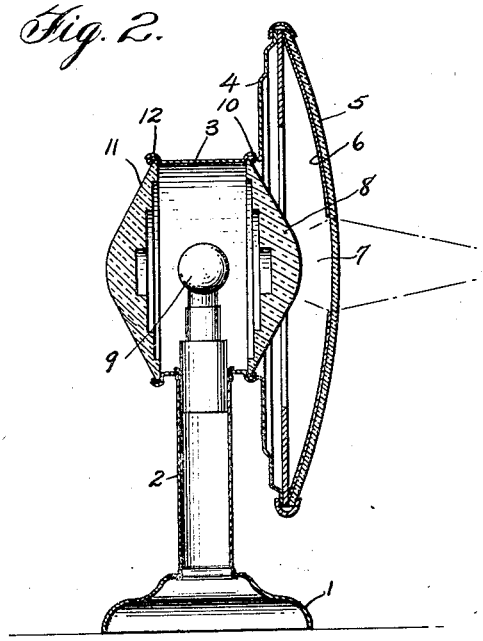
Fig. 2 is a vertical section through the combined lamp and mirror.
Figure 5:
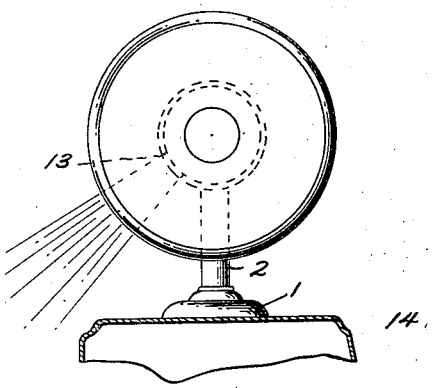
Fig. 5 is a front elevation, showing in dotted lines the location of the lateral port of the lamp for the illumination of the side of a road.
Figure 4:
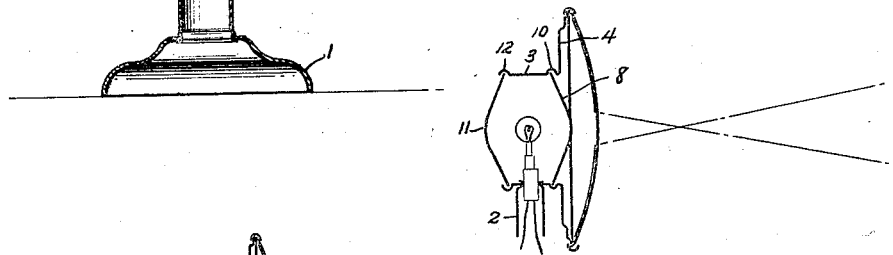
Fig. 4 is a similar view showing the effect upon the observer at a more distant range.
Figure 3:
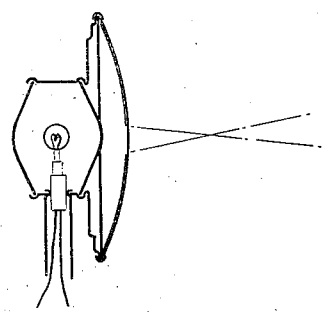
Fig. 3 is a diagrammatic view of the visual effect on the observer at close range of the danger signal, viewed through the clear space of the mirror.

The base 1 supports the standard 2 which enters the cylindrical body 3 of the lamp at the bottom. The cylindrical body terminates at one end in the flared portion 4 and forms with the flare, a lamp chamber. A convex glass mirror 5 is mounted in the flared portion and is provided in the rear with a layer of reflecting medium 6 which is removed from substantially the center, as at 7. A red lens 8 is mounted in the cylinder 3 between the mirror 5 and the source of illumination 9 and is held in the cylinder in any preferred manner as by means of the spring element 10. Obviously the filter or coloring medium 8 need not be positioned in the cylinder, but may be located at any point in the lamp chamber, it being necessary only that it be interposed between the light source and the cleared or transparent portion of the mirror. The other end of the cylinder is closed by a clear glass lens or other light transmitting means 11 held by a similar spring 12. At one side and just above the bottom of the cylinder 3 an opening or window 13 is provided, and so arranged that the light rays from the illuminating source 9 may pass laterally and downwardly over the fender 14 to illuminate the side of a road. The clear glass of the mirror 5 indicated by the numeral 7, may be so formed as to act as a lens to cause convergence of the rays of light passing through the lens 8 to focus on a point in advance of the mirror so that an observer at close range has a visual impression that the light is quite small. When the rays pass beyond the focal point they are caused to diverge with a consequent change in the visual effect, whereby the light appears much larger at a more remote point of observation.

However some of the rays diverging from the colored filter pass through the adjacent surface of the transparent portion of the mirror and are reflected by the inner side of the other surface, from which they are again reflected. Obviously this effects an apparent increase in the width of the colored light showing from the rear of the device, and which effect is heightened at a more remote point of observation.

Whether this effect on the observer is aided by the presence of the mirror is not known but it would seem, particularly on a dusty highway, that there would be a reflection in the mirror of the light rays passing through the center of the mirror and being reflected back by the minute particles of dust in the air so as to increase the visual effect on the observer. This co-operation between the clear glass of the reflector and the light rays coming through the colored lens is such that at close range, as for instance, from the operator's seat, the fact that the light is turned on does not interfere in any way with the use of the mirror for reflecting vehicles and other objects in the road behind the operator. Similarly in the day time, when the light is not being used, the dark spot formed by the red lens, behind the mirror, does not interfere at all with the use of the mirror.

It is thought that the use of the auxiliary driving opening will be apparent.

I claim as my invention:

1. In a device of the character described, a lamp chamber larger at one end than at the other, light transmitting means at the other or smaller end, and a mirror in the larger end having a transparent portion through which light can pass, and a source of illumination in the chamber.

2. In a device of the character described, a lamp chamber larger at one end than the other, light transmitting means in the smaller end, and a mirror in the larger end having a transparent portion through which light can pass, and a source of illumination in the chamber, said transparent portion being concentric with the mirror.

3. In a device of the character described, a lamp chamber larger at one end than at the other, light transmitting means at the smaller end, and a mirror in the larger end, having a transparent portion through which light can pass, and a source of illumination in the chamber, the light transmitting means and said mirror being concentric with the horizontal axis of the chamber.

4. In a device of the character described, a lamp chamber larger at one end than at the other, light transmitting means in the smaller end, and a mirror in the larger end having a transparent portion through which light can pass, and a source of illumination in the chamber, said light transmitting means, said mirror and the transparent portion thereof being concentric with the horizontal axis of said lamp chamber.

5. As an article of manufacture, a cylindrical body terminating in a flared portion at one end, light transmitting means in each end of said cylinder and a convex mirror having a central portion of clear glass mounted in said flared portion and a standard for supporting said cylinder.

6. As an article of manufacture, a cylindrical body terminating in a flared portion at one end, a lateral window in the cylinder, light transmitting means in the opening and the ends of said cylinder, a convex mirror having a central portion of clear glass mounted in said flared portion, a standard supporting the cylinder and an illuminating source mounted in the standard and adjacent the light transmitting means in said cylinder.

7. In a device of the character described a lamp chamber larger at one end than at the other, light transmitting means in the smaller end, a mirror in the larger end having a transparent portion through which light may pass, a source of illumination in said chamber, said light transmitting means, said mirror and the transparent portion thereof being concentric with the horizontal axis of said chamber, such axis also passing through the axis or source of illumination in said chamber.

8. The combination with a lamp chamber having light transmitting means at each end, of a mirror adjacent one end and having a transparent portion which cooperates with the mirror to cause an apparent increase in the size or width of light transmitted therethrough from the lamp chamber, the light transmitting means, mirror and transparent portion all being concentric with the horizontal axis of the chamber.

9. As an article of manufacture, a cylindrical body terminating in a flared portion at one end, light transmitting means in each end of the cylinder, and a mirror having a concentric portion of clear glass mounted in said flared portion, a light source in the body, and a standard for supporting said body.

10. As an article of manufacture a lamp body, a mirror mounted in the body, and having a cleared portion through which light can pass, a light source adjacent the mirror, light transmitting means in the body adjacent the light source but on the opposite side from the mirror, said clear portion and said means being concentric with the horizontal axis of said body, and means for supporting the body.

11. In a device of the character described a lamp chamber, an illuminating source in the chamber, a mirror having a light transmitting portion adjacent the light source in the chamber, means for transmitting colored light from the source to the light transmitting portion of said mirror for the visual effect of a danger signal, means for transmitting substantially white light from the other side of said chamber, said last mentioned means and the light transmitting portion being concentric with the horizontal axis of the chamber.

12. The combination with a lamp chamber, light transmitting means in one end of the chamber, a mirror in the other end of the chamber and having a cleared portion through which light may pass, a source of illumination in said chamber, said means and said cleared portion being concentric with the horizontal axis of said chamber.

13. A lamp comprising a body, light transmitting means in one end of the body, a mirror in the other end of the body, a source of illumination in said body, and light transmitting means associated with said mirror for transmitting colored light, both transmitting means and the mirror being concentric with the horizontal axis of the chamber.

In testimony whereof I affix my signature.

GEORGE L. HALL.